United States Patent [19]

Terai et al.

[11] Patent Number: 4,881,363
[45] Date of Patent: Nov. 21, 1989

[54] MOWING MACHINE

[75] Inventors: Akio Terai, Machida; Junichi Yoshino, Tokyo; Shinroku Satsumi, Machida; Mitsuru Taniguchi, Tokyo, all of Japan

[73] Assignee: Kamatsu Zenoah, Co., Tokyo, Japan

[21] Appl. No.: 86,496

[22] Filed: Sep. 21, 1987

[30] Foreign Application Priority Data

Aug. 26, 1986 [JP] Japan .................................. 61-198226
Jul. 6, 1987 [JP] Japan .................................. 62-102664
Jul. 6, 1987 [JP] Japan .................................. 62-102665

[51] Int. Cl.$^4$ ...................... A01D 34/76; A01D 34/68
[52] U.S. Cl. ........................................ 56/255; 56/295; 30/276
[58] Field of Search ................ 56/255, 256, 295, 12.7, 56/241, 242; 30/265, 264, 263, 276, 347, 240, 207

[56] References Cited

U.S. PATENT DOCUMENTS

| | | | |
|---|---|---|---|
| 1,275,851 | 8/1981 | Comfort | 56/255 |
| 2,119,683 | 6/1938 | Nevraumont | 30/207 |
| 2,648,904 | 8/1953 | Brooks et al. | 30/264 |
| 2,683,310 | 7/1954 | Majeski | 30/264 |
| 2,976,665 | 3/1961 | Speckman | 56/255 |
| 3,135,081 | 6/1964 | Booth | 56/255 |
| 3,472,007 | 10/1969 | Green | 30/265 |
| 3,618,304 | 11/1971 | Hundhausen | 56/255 |
| 3,631,658 | 1/1972 | Green | 56/11.3 |
| 3,701,238 | 10/1972 | Hintze | 56/10.4 |
| 4,268,964 | 5/1981 | Moore | 56/12.7 |
| 4,520,619 | 6/1985 | Doi et al. | 56/255 |
| 4,569,134 | 2/1986 | Kobayashi | 56/12.7 |

FOREIGN PATENT DOCUMENTS

| | | |
|---|---|---|
| 0117848 | 9/1984 | European Pat. Off. . |
| 320330 | 4/1974 | Fed. Rep. of Germany . |
| 2357162 | 2/1978 | France . |
| 516273 | 1/1972 | Switzerland . |

Primary Examiner—John Weiss
Attorney, Agent, or Firm—Helfgott & Karas

[57] ABSTRACT

To mow even soft grass more tidily in shearing mode without kicking pebbles, a pair of two grass cutting wheels are pivotally driven by an engine in two mutually-different directions. One cutting wheel is slidably fixed relative to the other cutting wheel for safety. The mowing machine can be used in common to shear off grass on the ground and trim a garden tree by adjusting an angle between a hollow grip pipe and the machine cutting surface.

4 Claims, 5 Drawing Sheets

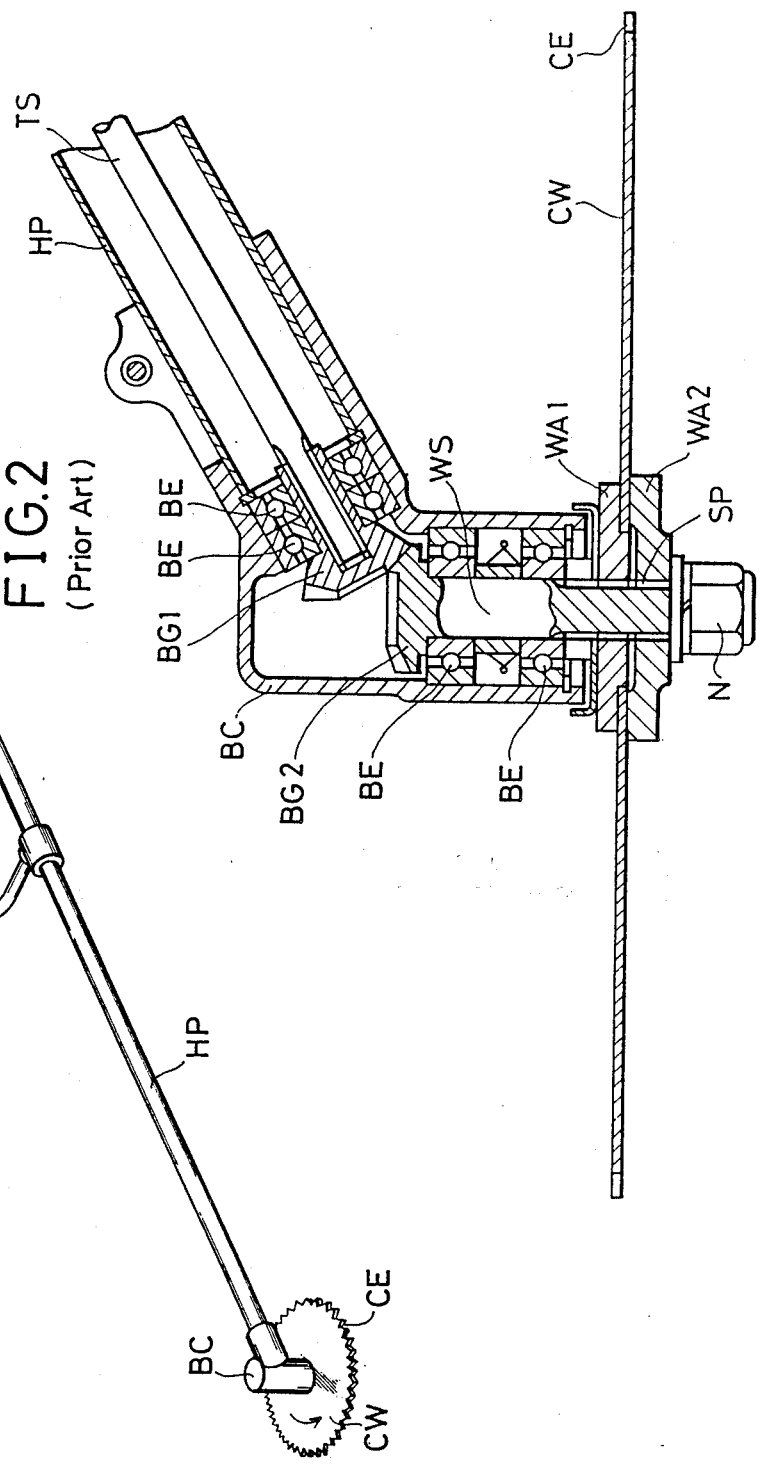

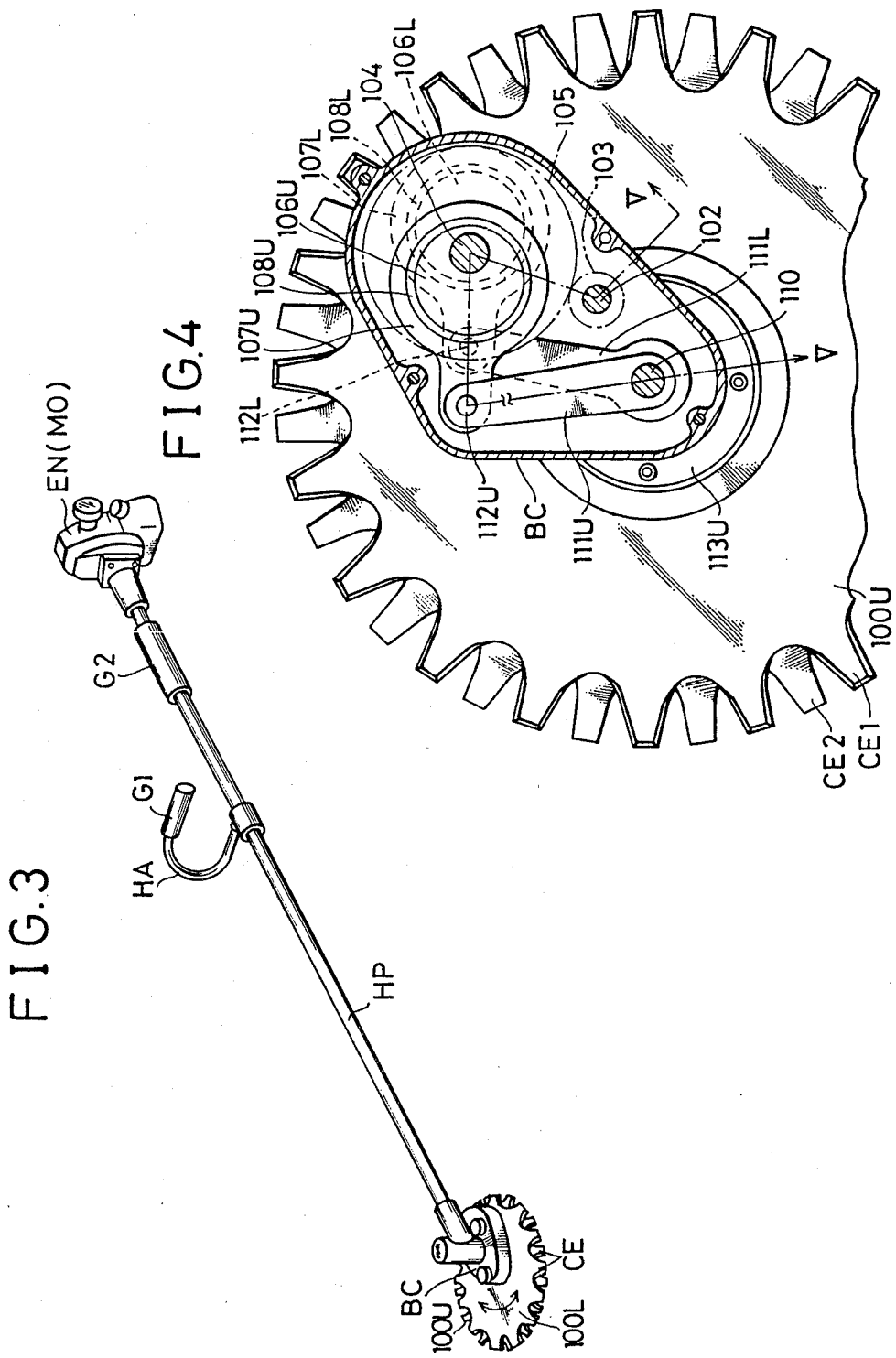

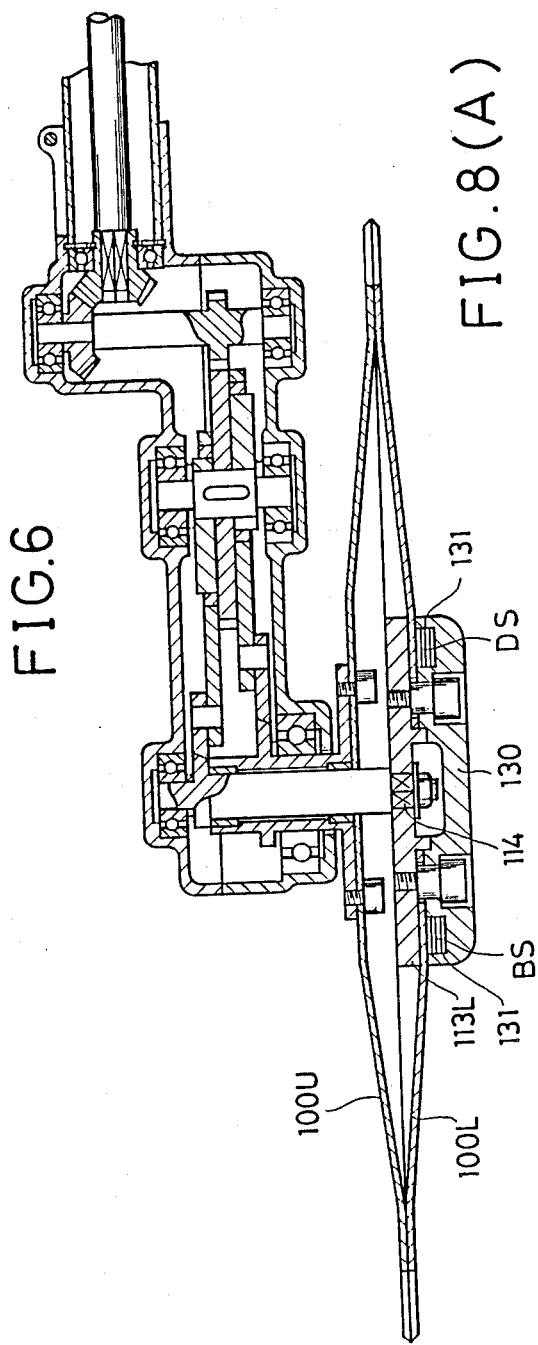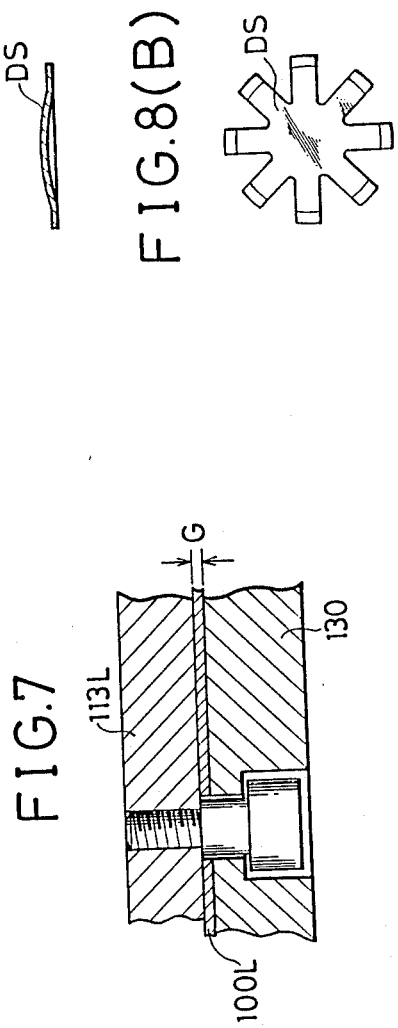

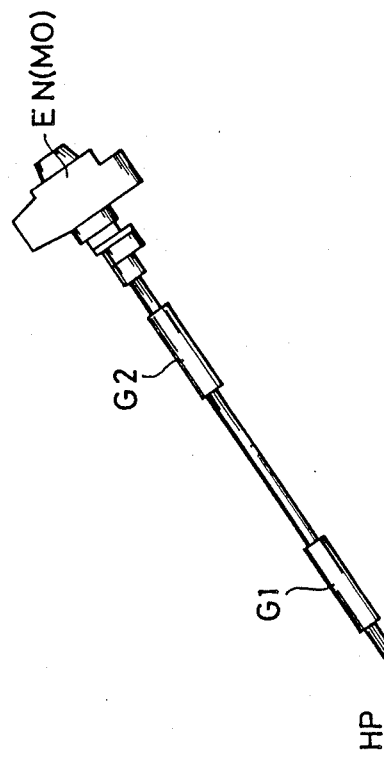
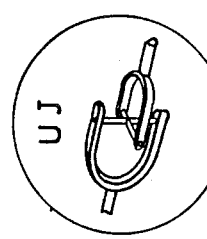
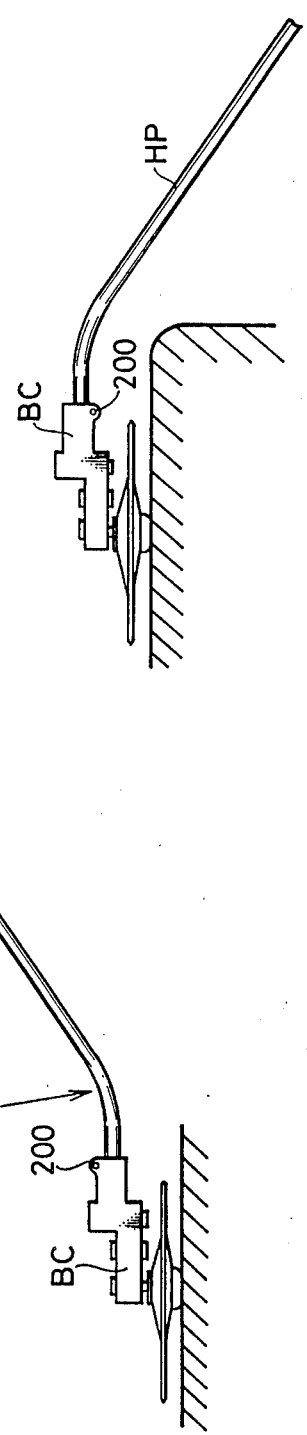
FIG.9(A)
FIG.9(B)
FIG.9

MOWING MACHINE

BACKGROUND OF THE INVENTION

1. Field of the Invention

The present invention relates to a mowing machine driven by an engine or the like to mow grass.

2. Description of the Prior Art

In prior-art mowing machine for mowing grass, a single rotatable cutter wheel is supported by a cutter support body and driven by an engine or a motor via a hollow pipe connected between the engine and the cutter support body. Therefore, when the worker grips two grip portions by both hands and swings the hollow pipe to and fro, it is possible to mow grass by the single rotating cutter wheel.

In the prior-art mowing machine, however, since only the single cutter wheel rotates at a relatively high speed, there exist various problems such that pebblestones may be dangerously kicked off; the machine itself must be swung violently to mow grass; and soft grass usually remains unmowed.

A more detailed description of the prior-art mowing machine will be made with reference to the attached drawings under DETAILED DESCRIPTION OF THE PREFERRED EMBODIMENTS.

SUMMARY OF THE INVENTION

With these problems in mind, therefore, it is the primary object of the present invention to provide a novel mowing machine which can improve the mowing performance, that is, mow even soft grass more tidily without kicking pebbles.

To achieve the above-mentioned object, a mowing machine according to the present invention comprises: (a) motive power source; (b) a pair of superposed pivotal cutting wheels each provided with a number of grass cutting edges; and (c) means for converting a rotational motion supplied from said motive power source into two pivotal motions to drive said pivotal cutting wheels in two mutually different rotational directions.

The motive power source is an engine or a motor. The rotational motion converting means comprises (a) a casing; (b) a cam shaft; (c) first and second circular and eccentric cams; (d) first and second annular connecting rods; (e) a pivotal cutting wheel shaft provided with a first pivotal cutting wheel and driven by the first annular connecting rod; and a cylindrical member provided with a second pivotal cutting wheel coaxially with the first pivotal cutting wheel and driven by the second annular connecting rod.

Further, a plurality of dish-shaped plate springs are provided for slidably supporting one of the cutting wheels for safety. Furthermore, the two pivotal cutting wheels are driven by an engine through a bent hollow pipe including a universal joint, so that grass on the ground can be mowed and additional garden trees can be trimmed by adjusting the cutting angle relative to the hollow pipe (grips).

BRIEF DESCRIPTION OF THE DRAWINGS

The features and advantages of the mowing machine according to the present invention over the prior-art machine will be more clearly appreciated from the following description of the preferred embodiments of the invention taken in conjunction with the accompanying drawings in which like reference numerals designate the same or similar elements or sections throughout the figures thereof and in which:

FIG. 1 is a perspective view showing an example of prior-art mowing machines;

FIG. 2 is an enlarged cross-sectional view showing a rotary cutter wheel and a cutter wheel support body of the prior-art mowing machine;

FIG. 3 is a perspective view showing a first embodiment of the mowing machine according to the present invention;

FIG. 4 is an enlarged bottom view showing a pair of pivotal cutting wheels and an essential portion of a drive mechanism incorporated in the mowing machine shown in FIG. 3;

FIG. 6 is a similar cross-sectional view of the pivotal cutting wheels and the drive mechanism of a second embodiment of the mowing machine according to the present invention;

FIG. 7 is a fragmentary enlarged view for assistance in explaining a lower pivotal cutting wheel;

FIG. 8(A) is a cross-sectional view showing a dish-shaped plate spring for providing a frictional force between the two upper and lower pivotal cutting wheels;

FIG. 8(B) is a top view showing the dish-shaped plate spring;

FIG. 9 is a universal joint coupling.

FIG. 9(A) is a side view showing a bent hollow pipe connected between the bearing casing and the engine and so fixed to the bearing casing as to be suitable for use in mowing grass on the ground; and FIG. 9(B) is a similar side view showing the bent hollow pipe so fixed to the bearing casing as to be suitable for use in trimming garden trees.

DETAILED DESCRIPTION OF THE PREFERRED EMBODIMENTS

Figure 5:
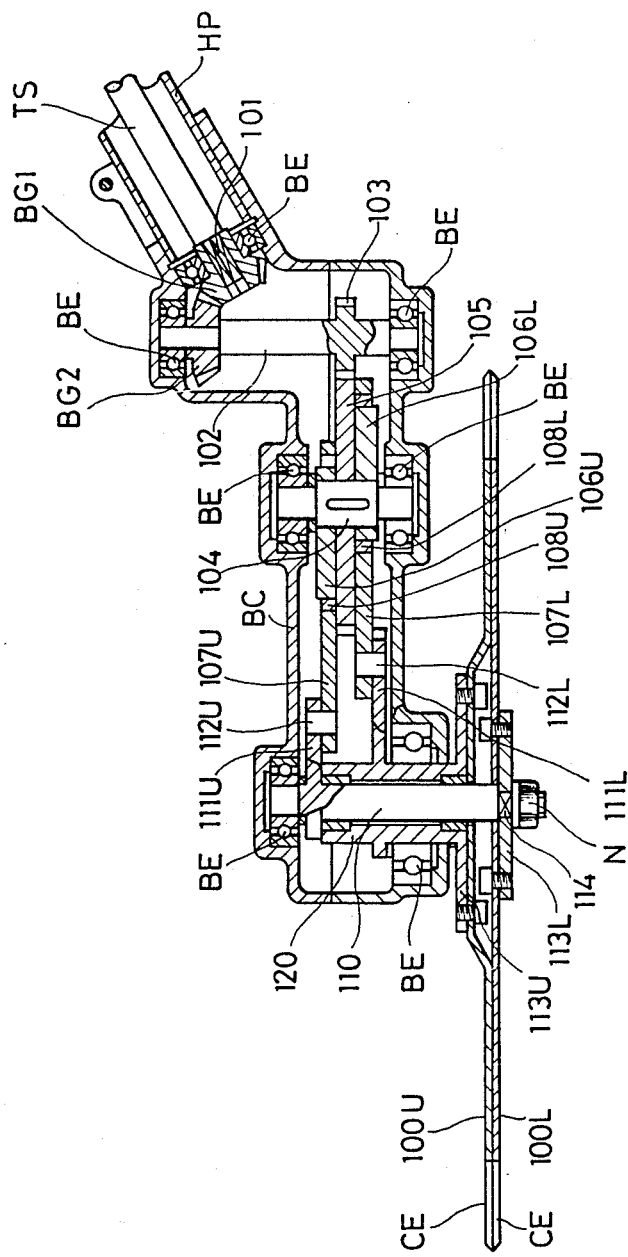
FIG. 5 is an enlarged cross-sectional view of the pivotal cutting wheels and the drive mechanism shown in FIG. 4.

To facilitate understanding of the present invention, a brief reference will be made to a prior-art mowing machine, with reference to the attached drawings.

In FIG. 1(A), a rotary cutting wheel CW formed with a number of cutting edges CE at the outer periphery thereof is rotatably supported by a bearing casing BC (cutter support body) and further driven by an engine EN via a hollow pipe HP connected between the bearing casing BC and the engine EN. A handle HA including a first grip $G_1$ is fixed at roughly the middle of the hollow pipe HP, and a second grip G2 is directly fitted to the hollow pipe HP so that the worker can swing the machine to and fro by griping the hollow pipe HP by both hands.

In more detail with reference to FIG. 2, a transmission shaft TS driven by the engine EN is rotatably supported by two bearings BE fixed to a junction point between the bearing casing BC and the hollow pipe HP. At the lowermost end of the transmission shaft TS, a first bevel gear $BG_1$ is fixed. On the other hand, a wheel shaft WS is also rotatably supported by two bearings BE fixed to the lower side of the bearing casing BC. At the uppermost end of the wheel shaft WS, a second bevel gear $BG_2$ is formed so as to be in mesh with the first bevel gear $BG_1$ The cutting wheel CW is pinched between two washers $WA_1$ and $WA_2$ and fixed to the wheel shaft WS with a spline SP and a nut N.

When the worker grips the two grips $G_1$ and $G_2$ and swings the hollow pipe HP to and fro, grass can be mowed by the cutting wheel CW driven by the engine EN at a relatively high speed.

In the prior-art mowing machine, however, since only the single cutting wheel CW rotates at a relatively high speed, there exist various shortcomings such that pebblestones may be kicked and soft grass cannot be well mowed even when the cutting wheel CW is moved violently to and fro.

In view of the above description, reference is now made to a first embodiment of a mowing machine according to the present invention.

In FIG. 3, the feature of the mowing machine according to the present invention is to drive a pair of upper and lower pivotal cutting wheels 100U and 100L by an engine EN or an electric motor MO in two mutually opposite directions (clockwise and counterclockwise) in order to mow grass between two cutting edges formed along each outer periphery of the two pivotal cutting wheels 100U and 100L. That is to say, grass can be cut off in shearing mode, being different from the prior-art cutter wheel which cuts off grass in chopping mode.

In more detail in FIGS. 4 and 5, a transmission shaft TS is passed through a hollow pipe HP and rotatably supported by a bearing BE fixed to the lower end of the hollow pipe HP. A first bevel gear $BG_1$ is fixedly fitted to a square shaft portion 101 formed at the lower end of the transmission shaft TS as in the prior-art shown in FIG. 2.

An intermediate shaft 102 is rotatably supported vertically within the bearing casing BC by two upper and lower bearings BE. A second bevel gear $BG_2$ is fixed to the intermediate shaft 102 so as to be in mesh with the first bevel gear $BG_1$. In addition, a small spur gear 103 is formed in the intermediate shaft 102.

On the other hand, a cam shaft 104 is rotatably supported within the bearing casing BC by two upper and lower bearings BE. A large spur gear 105 is fixed to the cam shaft 104 at such a position as to engage with the small spur gear 103. Further, two (upper and lower) circular and eccentric cam plates 106U and 106L are fixed to the cam shaft 104 with keys. Here, it should be noted that these two circular cam plates 106U and 106L are eccentrically fixed on both the upper and lower surfaces of the large spur gear 105 in radially symmetrical positional relationship to each other with respect to the center of the cam shaft 104.

Further, each of two upper and lower annular connecting rods 107U and 107L is fitted to each of the cam plates 106U and 106L, respectively via each of two upper and lower annular bearings 108U and 108L.

A pivotal cutter wheel shaft 110 is also rotatably supported vertically within the bearing casing BC via a bearing BE. An upper arm 111U is fixed to the uppermost end of the pivotal cutter wheel shaft 110, and one end of the arm 111U is pivotably connected to an end of the upper annular connecting rod 107U via a pin 112U. Further, a lower cutter wheel support plate 113L is fitted to a square portion 114 of the pivotal center wheel shaft 110 and fixed to the shaft 110 by a nut N. A lower cutting wheel 100L is fixed to the lower cutter wheel support plate 113L with bolts as shown in FIG. 5.

On the other hand, a cylindrical member 120 formed with a middle arm 111L and an upper cutter wheel support plate 113U is rotatably fitted to the pivotal center wheel shaft 110. An end of the middle arm 111L is also pivotably connected to an end of the lower annular connecting rod 107L via a pin 112L. Further, an upper cutting wheel 100U is fixed to the upper cutting wheel support plate 113U with bolts as shown in FIG. 5.

In operation, when the engine EN is driven, power is transmitted to the cam shaft 104 by way of the transmission shaft TS, the first bevel gear $BG_1$, the second bevel gear $BG_2$, the small spur gear 103 and the large spur gear 105, so that the cam shaft 104 rotates. Therefore, the two circular eccentric cam plates 106U and 106L fixed to the cam shaft 104 rotate, so that the two annular connecting rods 107U and 107L are driven reciprocably to and fro in FIG. 4. In this case, since the annular connecting rods 107U and 107L are located in radially symmetrical positional relationship to each other with respect to the center of the cam shaft 104, the two arms 111U and 111L connected to the two connecting rods 107U and 107L respectively are driven in two opposing directions, respectively. As a result, the two upper and lower pivotal cutter wheels 100U and 100L are driven so as to pivot in two different directions, respectively to shear off grass caught between two cutter edges CE of the upper and lower pivotal cutting wheels 100U and 100L. Therefore, it is unnecessary for the worker to chop grass by swinging the machine as in the conventional machine, because the machine according to the present invention mows grass in shear mode as by scissors.

FIG. 6 shows a second embodiment of the mowing machine according to the present invention.

In the first embodiment shown in FIGS. 3, 4 and 5, it is necessary to provide an excessive drive power relief device somewhere for the machine in order to prevent the cutting edges CE from being damaged when a rigid material such as metal piece is caught between the cutting edges. For this purpose, a clutch (not shown) can be provided between the transmission shaft TS and the engine EN. Or else, some parts of the bevel gears, the spur gears, the cam plates, etc. can be slidably mounted on the related parts.

For the purpose, in the second embodiment shown in FIG. 6, the lower pivotal cutting wheel 100L is slidably supported relative to the upper pivotal cutting wheel 100U by use of a plurality of dish-shaped plate springs DS.

In more detail, a lower cutter wheel support plate 113L is fitted to a square shaft portion 114 and fixed thereto by a nut. Further, a cutter wheel push plate 130 is fixed to the cutter wheel support plate 113L by screws with the lower pivotal cutting wheel 100L loosely sandwiched therebetween so as to provide a gap G (shown in FIG. 7) wide enough to allow the lower cutting wheel 100L to be rotatable.

Further, a plurality of recesses 131 are formed on the upper surface of the cutter wheel push plate 130. A few dish-shaped springs DS as shown in FIGS. 8(A) and (B) are inserted into each recesses 131 in superposed relationship to each other in order to provide appropriate frictional forces between the two upper and lower pivotal cutting wheels 100U and 100L (at the outer peripheries thereof) and between the lower cutter wheel support plate 113L and the lower cutting wheel 100L (at the inner periphery thereof), in dependence upon the elastic force of the springs BS.

Therefore, when an excessive torque or shock is applied to the lower pivotal cutting wheel 100L because of a presence of rigid substance between two cutting edges, the lower pivotal cutting wheel 100L is slidably moved against a frictional force produced by the dish-shaped springs BS relative to the cutter wheel support plate 113L or to the upper pivotal cutting wheel 100U, in order to prevent the cutting wheels and other power transmitting parts from being damaged.

Further, in the second embodiment shown in FIG. 6, since the upper and lower pivotal cutting wheels 100U and 100L are also formed into a dish shape, the outer peripheries of the two pivotal cutting wheels 100U and 100L are brought into tight contact with each other in dependence upon the elastic force of the cutting wheels themselves, thus it being possible to prevent grass from being sandwiched between cutting edges CE of the two cutting wheels 100U and 100L.

Further, it is of course possible to slidably mount the upper pivotal cutting wheel 100U relative to the lower pivotal cutting wheel 100L.

FIGS. 9(A) and (B) show a third embodiment of the mowing machine according to the present invention.

In the prior-art mowing machine, the hollow pipe HP connected between the engine EN and the bearing casing BC is formed straight. Therefore, the machine is convenient for mowing grass on the ground, but inconvenient in trimming the upper surface of garden trees or a hedge, for instance. To overcome this problem, the hollow pipe HP is bent at an angle near the bearing casing BC as shown in FIG. 9(A). In this case, the transmission shaft TS is connected via a universal joint UJ or coupling as shown by a circle in FIG. 9.

In use, where the machine is used to mow grass on the ground, a screw 200 shown in FIG. 9(A) is loosened, and the hollow pipe HP is fixed relative to the cutting wheels at such a position as shown in FIG. 9(A). In contrast with this, where the machine is used to trim a garden tree, the screw 200 is loosened, and the hollow pipe HP is fixed as shown in FIG. 9(B).

Furthermore, in the above embodiments, the bearing casing BC is connected to the engine EN via the hollow pipe HP. Without being limited thereto, however, it is also possible to directly connect the engine to the bearing casing (without use of the pipe) to minimize the shape of the machine so that the machine is usable for trimming a low garden tree or lawn.

Further, it is of course possible to drive the cutting wheels by a motor in stead of an engine.

As described above, in the mowing machine according to the present invention, since the two cutting wheels are pivotally driven by an engine in two opposite rotational directions (clockwise and counterclockwise) at a relatively low speed to cut off grass in shear mode, the exist various advantages as follows: (a) Since the cutting wheels are not driven at a high speed, there exists no danger such that pebblestones are kicked off; (2) Since grass is cut off between two cutter edges in shear mode, even soft grass can easily be sheared off without leaving grass unmowed; (3) Since cutting edges are arranged in every direction, the worker can shear off grass in various directions by simply moving only the cutting wheels straight in any desired directions; (4) Since dish-shaped springs are provided so as to slidably rotate one of the two pivotal cutting wheels relative to the other in case an excessive force is applied to the wheels, it is possible to prevent the cutting edges from being damaged; (5) Since the two pivotal cutting wheels are formed into a dish shape, it is possible to prevent grass from being sandwiched between two cutting wheels; (6) Since the hollow pipe is bent slightly via a universal joint near the bearing casing, it is possible to use the mowing machine both in mowing grass on the ground and trimming a garden tree.

What is claimed is:

1. A mowing machine comprising:
   (a) motive power source;
   (b) a pair of superposed pivotal cutting wheels each provided with a number of grass cutting edges; and
   (c) means for converting a rotational motion supplied from said motive power source into two pivotal motions to drive said pivotal cutting wheels in two mutually different rotational directions, said rotational motion converting means comprising:
   a casing (BC);
   a cam shaft (104) rotatably driven by said motive power source within said casing;
   first and second circular and eccentric cams (106U, 106L) fixed to said cam shaft in radially symmetrical positional relationship to each other with respect to a center of said cam shaft;
   first and second annular connecting rods (107U, 107L), each slidably fitted to each outer periphery of said first and second circular and eccentric cams, respectively;
   a pivotal cutter wheel shaft (110) having at one end thereof a first arm (111U) pivotally connected to an end of said first annular connecting rod (107U) and at the other end thereof a first pivotal cutter wheel (100L); and
   a cylindrical member (120) loosely and coaxially fitted to said pivotal cutter wheel shaft, said member having at a middle thereof a second arm (111L) pivotally connected to an end of said second annular connecting rod (107L) and at one end thereof a second cutter wheel (100U) in such a way that said two pivotal cutting wheels are concentrically superposed with each other.

2. The mowing machine as set forth in claim 1, which further comprises:
   a transmission shaft (TS) for transmitting power of said motive power source;
   a first bevel gear ($BG_1$) fixed to an end of said transmission shaft remote from the other end connected to said motive power source;
   an intermediate shaft (102 rotatably supported within said casing (BC);
   a second bevel gear ($BG_2$) fixed to said intermediate shaft (102) so as to be in mesh with said fire bevel gear;
   a small spur gear (103) fixed to said intermediate shaft; and
   a large spur gear (105) fixed to said cam shaft (104) so as to be in mesh with said small spur gear (103).

3. The mowing machine as set forth in claim 2, wherein said transmission shaft (TS) comprises a universal joint (UJ) near said casing to provide a bent transmission shaft.

4. The mowing machine as set forth in claim 3, wherein said bent transmission shaft (TS) is adjustably rotatable and fixed to said casing to obtain cutting wheel angles relative to said transmission shaft (TS).

* * * * *